US 11,787,667 B2

(12) United States Patent
Kofman et al.

(10) Patent No.: US 11,787,667 B2
(45) Date of Patent: Oct. 17, 2023

(54) LIFTING ASSEMBLY AND A METHOD FOR HANDLING A COMPONENT

(71) Applicant: Vestas Wind Systems A/S, Aarhus N. (DK)

(72) Inventors: Joris Kofman, Aalborg Øst (DK); Michael Egstrøm, Jordrup (DK)

(73) Assignee: Vestas Wind Systems A/S, Aarhus N (DK)

( * ) Notice: Subject to any disclaimer, the term of this patent is extended or adjusted under 35 U.S.C. 154(b) by 276 days.

(21) Appl. No.: 17/417,965

(22) PCT Filed: Dec. 17, 2019

(86) PCT No.: PCT/DK2019/050402
§ 371 (c)(1),
(2) Date: Jun. 24, 2021

(87) PCT Pub. No.: WO2020/135906
PCT Pub. Date: Jul. 2, 2020

(65) Prior Publication Data
US 2022/0073319 A1 Mar. 10, 2022

(30) Foreign Application Priority Data
Dec. 28, 2018 (DK) .......................... PA 2018 70875

(51) Int. Cl.
*B66C 13/08* (2006.01)
*B66C 23/18* (2006.01)
*B66C 23/20* (2006.01)

(52) U.S. Cl.
CPC ............ *B66C 13/08* (2013.01); *B66C 23/185* (2013.01); *B66C 23/207* (2013.01)

(58) Field of Classification Search
CPC ......... B66C 1/108; B66C 13/04; B66C 13/06; B66C 13/08; B66C 13/10; B66C 23/185;
(Continued)

(56) References Cited

U.S. PATENT DOCUMENTS 4,474,263 A * 10/1984 Christopher ............. A62B 1/02
182/142
9,016,029 B2 * 4/2015 Wagner ................ E04H 12/342
52/745.18
(Continued)

FOREIGN PATENT DOCUMENTS

CN 104540766 A 4/2015
CN 105692448 A * 6/2016 ............. B66C 13/06
(Continued)

OTHER PUBLICATIONS

European Patent Office, Office Action issued in corresponding EP Application No. 19823907.1, dated Mar. 29, 2023.
(Continued)

*Primary Examiner* — Michael R Mansen
*Assistant Examiner* — Henrix Soto
(74) *Attorney, Agent, or Firm* — Wood Herron & Evans LLP

(57) ABSTRACT

The invention provides a lifting assembly comprising a support structure (4) arranged to support a load (2) suspended from the support structure, a guide line (501) arranged to extend from a first location, to a second location, a wheel assembly (601) with one or more wheels (621, 622, 623) arranged to engage, and roll along, the guide line (501), and a control line assembly (701) arranged to extend from the wheel assembly (601) to the load (2), wherein the lifting assembly comprises a retainer (801) arranged to connect, between the first and second locations, the guide line (501) to the support structure (4).

20 Claims, 7 Drawing Sheets

(58) Field of Classification Search
CPC ....... B66C 23/207; B66C 23/62; F03D 13/10;
F03D 13/20; F03D 13/25; F03D 13/40;
F05B 2230/60; F05B 2230/604; F05B
2230/61; Y02E 10/72
USPC .......................................................... 212/232
See application file for complete search history.

(56) References Cited

U.S. PATENT DOCUMENTS

| | | | |
|---|---|---|---|
| 2010/0018055 A1* | 1/2010 | Lynderup | F03D 13/40 |
| | | | 29/889 |
| 2011/0094987 A1 | 4/2011 | Botwright et al. | |
| 2011/0272377 A1 | 11/2011 | Willim et al. | |
| 2012/0125875 A1 | 5/2012 | Richter | |
| 2014/0263141 A1* | 9/2014 | May | B66C 21/04 |
| | | | 212/242 |
| 2015/0183620 A1 | 7/2015 | Hansen et al. | |
| 2015/0219067 A1* | 8/2015 | Clymans | E02B 17/0004 |
| | | | 29/283 |
| 2016/0002010 A1* | 1/2016 | May | E04G 23/084 |
| | | | 212/273 |

FOREIGN PATENT DOCUMENTS

| | | | | |
|---|---|---|---|---|
| CN | 106865415 A | * | 6/2017 | ............. B66C 13/04 |
| CN | 206288865 U | | 6/2017 | |
| CN | 107381379 A | | 11/2017 | |
| DE | 102014105356 A1 | | 10/2015 | |
| DE | 102014013953 A1 | | 3/2016 | |
| EP | 2889251 A1 | | 7/2015 | |
| JP | S59224653 A | | 12/1984 | |
| JP | S6156975 B2 | | 12/1986 | |
| JP | H04266397 A | * | 9/1992 | |
| JP | H06156975 A | * | 6/1994 | |
| JP | 2014208989 A | * | 11/2014 | |
| WO | 2018228809 A1 | | 12/2018 | |

OTHER PUBLICATIONS

Danish Patent and Trademark Office, Searrch and Examination Report in PA 2018 70875, dated Jul. 10, 2019.
European Patent Office, International Search Report and Written Opinion in PCT Application No. PCT/DK2019/050402, dated Mar. 13, 2020.
China National Intellectual Property Administration, Second Office Action issued in corresponding Chinese Application No. 201980092504.1, dated Jun. 25, 2023 (with English translation).
China National Intellectual Property Administration, Office Action issued in corresponding Chinese Patent Application No. 201980092504.1, dated Apr. 27, 2023, with English translation.

* cited by examiner

LIFTING ASSEMBLY AND A METHOD FOR HANDLING A COMPONENT

TECHNICAL FIELD

The present invention relates to a lifting assembly comprising a support structure arranged to support a load suspended from the support structure, and to a method for handling a component, in particular a wind turbine component.

BACKGROUND INFORMATION

A horizontal axis wind turbine is known to have an electric generator in a nacelle on top of a tower, where a rotor with a substantially horizontal axis mounted to the nacelle and arranged to drive the generator. The nacelle is usually arranged to be rotated in relation to the tower, to point the rotor towards the wind.

With growing sizes of horizontal axis wind turbines, challenges in handling of components, such as blades, increase. One such challenge is to control a component when the component is suspended from a crane boom assembly, i.e. during installation of the component on a wind turbine. For example, a suspended wind turbine blade, which may be 60-80 metres long and have a mass of 10-30 tons, may be sensitive to wind gusts, and may present inertia forces.

JP6156975 presents a system for controlling the swivel of a load suspended with a crane. Two guide lines are stretched along a boom of the crane. Two wheel assemblies are provided, each of which is arranged to engage and move along a respective of the guide lines. Two control lines are provided. Each control line extends along a respective of the guide lines, and from the respective wheel assembly to the load. Thereby, each wheel assembly may move vertically with the load, by means of the respective control line, while the control lines prevent swiveling of the load. A wheel assembly for co-operation between a crane boom guide wire and a load control wire is described in EP2889251. The wheel assembly comprises three or more pulley wheels captured in a rigid housing.

Although the systems according to JP6156975 or EP2889251 have benefits, a problem with them is that the guide lines may flex by forces in the control lines, which reduces the control over the load by the control lines. Such forces in the control lines could be caused e.g. by wind gusts and/or load inertia. This prevents precise management of the load, which limits the reduction of the installation time of a component, and/or prevents an increase of the weather window for the component installation. Moreover, it can be seen from JP6156975 that the guide wire extends only along and up a first, lower boom of the crane shown therein. In JP6156975, there is no guide wire arrangement for controlling the load when it is lifted higher up than the level of the first, lower boom. i.e. there is no guide wire up the second, upper, jib-type boom. Also from EP2889251, the guide wire does not extend up the angled jib atop the crane boom.

SUMMARY OF THE INVENTION

It is an object of the present invention to facilitate the handling of components, in particular wind turbine components. It is also an object of the invention to increase the precision in the management of a load suspended from a support structure, such as a crane boom assembly. It is a further object of the invention to reduce the installation time of a component, in particular a wind turbine component. It is also an object of the invention to increase the weather window for the installation time of a component, in particular a wind turbine component.

The objects are reached with a lifting assembly according to claim 1. Thus, the invention provides a lifting assembly comprising a support structure arranged to support a load suspended from the support structure, a guide line arranged to extend from a first location to a second location, a wheel assembly with one or more wheels arranged to engage, and roll along the guide line, and a control line assembly arranged to extend from the wheel assembly to the load. The lifting assembly comprises a retainer arranged to connect, between the first and second locations, the guide line to the support structure.

The support structure may have elongated shape. The guide line may be arranged to extend along the support structure. The first location may be at a height lower than the second location. The first location may be on the support structure. The first location may be on a supporting element supporting the support structure, such as a crane base or an overcarriage of a crane; the ground, or a marine vessel. The second location may be on the support structure. The first location may be at a height less than half the height of the second location, in relation to a ground level at the lifting assembly. Alternatively or additionally, the first location may be less than half the distance up the support structure, measured along the support structure from the lower end of the support structure. The second location may be further than half way up the support structure, measured along the support structure from the lower end of the support structure. Alternatively or additionally, the first location may be in the vicinity of the base of the support structure. Alternatively or additionally, the second location may be in the vicinity of the top of the support structure.

The control line assembly may form a connection between the wheel assembly, and the load. The lifting assembly may be arranged so that when the load is moved upwards while suspended from the support structure, the wheel assembly moves along the guide line, by means of the connection to the load, away from the first location, and towards the second location. The lifting assembly may be arranged so that when the load is moved downwards while suspended from the support structure, the wheel assembly moves along the guide line, under control of the connection to the load, away from the second location, and towards the first location.

The guide line, the wheel assembly, and the control line assembly may form, or form a part of, a control line system for controlling the suspended load. The control of the suspended load may include controlling the swivel of the load. The load may comprise a component, for example a wind turbine component. The load may comprise a yoke holding a component. The control line assembly may be arranged to extend from the wheel assembly to a yoke holding a component, or to the component.

It is understood that the wheel assembly may move along the guide line, by means of the control line assembly. In particular, the wheel assembly may be drawn along the guide line, by the lifting or lowering movement of the load, to which the wheel assembly is connected, via the control line. Thus, the suspended load may use the guide line as a guide. The control line assembly may be provided in a variety of ways. For example, the control line assembly may comprise a control line and a winch. The winch may be provided e.g. at a lower part of the support structure, at an over carriage of a crane presenting the supporting structure, or on the ground. Thereby an upper end of the control line may be fixed, e.g. to the support structure, and a lower part of the control line may be wound by the winch. Thereby, the control line may be tensioned between the suspended load and the guide line by tensioning of the control line by the winch. In alternative embodiments, a lower end of the control line may be fixed, and an upper part of the control line may be wound by a winch. Thereby, the winch may the mounted of the support structure. Alternatively, the control line assembly can comprise a winch on a yoke included in the suspended load.

The support structure may be an elongate assembly comprising one or more elongate structure segments. A structure segment may define and extend along a longitudinal axis. In some embodiments, a structure segment may be an elongate element sometimes known as a tower or boom or telescopic boom or jib or other such terms denoting an elongate structural segment especially a lifting-load bearing segment. A support structure may comprise combinations of structure segments of a same type or of a different type. For example, a support structure may comprise a tower or telescopic boom by way of a first structure segment and a boom or jib by way of a second structure segment. A longitudinal axis of a structure segment may extend in a straight line or in a substantially straight line. Preferably in the present context, an elongate support structure assembly may comprise two or more elongate structure segments. Structure segments may also be simply referred to as boom segments, even though these may be of different types, such as tower or mast or telescopic tower or jib or tower jib or boom jib telescopic boom etc. Similarly, herein, an elongate support structure assembly may also simply be referred to as a boom assembly. Thereby, the lifting arrangement may be a crane. The load may be suspended from the boom assembly. The crane may be of any suitable type. For example, the crane may be a mobile crane, or a tower crane. The crane may be a luffing tower crane. The lifting arrangement may comprise a tower crane which is erected by mounting crane parts on top of erected crane parts. Thus, a tower crane may have a capacity to build itself, i.e. to be self-erecting, wholly or partly avoiding the need for a larger crane during the build. It should be noted that the boom assembly may be provided in a variety of ways. A boom segments may, or may not, be telescopic. In the case of a tower crane, the vertical tower may for present purposes be referred to as a boom, in particular as a first boom or lower boom. The guide line may be arranged to extend along the boom assembly. The first location may be under the second location. The first location may be on the boom assembly. The first location may be on a supporting element supporting the boom assembly, such as the ground, or a marine vessel. The retainer may be arranged to connect, between the first and second locations, the guide line to the boom assembly. Preferably, the second location may be on a second boom or upper boom. The terms first boom and second boom may in particular refer to a respective lower and upper boom. A second boom may in particular be connected at its lower end to an upper end of a first boom. In many cases, such as in the context of a crawler type crane or telescopic boom crane, a second boom or upper boom may be referred to as a jib. The present invention may find particular advantage in a lifting assembly in which a second boom extends above a first boom. In particular, the first and second boom may define a kinked arrangement, wherein the longitudinal axes of the first and second booms are not aligned. The term "kink" in this context may refer to an inflection point, in particular along a support structure. Typically, a first boom may extend along an axis closer to the vertical than the second boom. In other words, the second boom may have a more shallow angle of elevation, i.e. a lower angle of elevation, than the first boom. In such an arrangement, e.g. as shown in JP6156975, it is not at present possible to extend the guide wire up higher than the top of the first, lower boom. One reason for this may be that the tendency for the guide line to flex, or bulge, and thereby undermine controllability of a suspended load via a control wire, may be increased if the guide line were stretched between the lower boom and the upper boom, e.g. from low on the lower boom, to high on the upper boom. A further reason may include that a tensioned guide line extending between a lower and an upper boom may tend to apply a bending load between the upper and lower boom which may be considered unacceptable. Preferably therefore, the retainer per the present disclosure may be arranged to connect the guide line to the boom assembly, between the first and second locations, at a location along the support structure where the support structure defines an inflection.

The retainer being arranged to connect, between the first and second locations, the guide line to the support structure, may involve the retainer being arranged to connect, at a distance from the first location, and at a distance from the second location, the guide line to the support structure. The retainer being arranged to connect the guide line to the support structure, restrains the guide line from being pulled away from the support structure by a load acting on the control line assembly, e.g. due to horizontal forces on the load and/or due to an inflection between a lower and an upper boom. The retainer may prevent the guide line from having too much "play" in relation to the support structure. This may apply to a guide line along a single longitudinally extending structural segment but also in relation to a support structure presenting an inflection between longitudinally extending structural segments thereof. Preventing the guide line to flex away from support structure allows the control line system to maintain its geometry to a large degree, despite forces acting on the load. This allows more precise management of the load. Thereby, the installation time of components handled by the lifting assembly may be reduced. In addition, the reduced sensitivity to forces acting on the load allows an increase of the weather window for handling components by the lifting arrangement.

In some embodiments, the support structure may comprise a wind turbine tower with a crane mounted to the tower. The load may be suspended from the crane. The guide line may be arranged to extend along the tower. The first location may be on the ground or near the base of the tower. The second location may be on the crane or near the top of the tower. The retainer may be arranged to connect, between the first and second locations, the guide line to the tower. Advantageously, tower may have a capacity for introduction of moments between lower and upper ends of the tower. Thereby, the tower may be suited for absorbing a force, with a component perpendicular to its longitudinal direction, provided by the retainer.

Preferably, the retainer comprises a retainer bracket for fixing the retainer to the guide line. The retainer bracket may be provided in a variety of ways. For example, the retainer bracket may present a seat for accommodating the guide line. The guide line may be held in the seat by a tension in the connection between the guide line and the boom assembly by means of the retainer. In some embodiments, the retainer bracket may comprise a clamp arranged to engage the guide line.

The retainer may comprise a connection element, connecting the retainer bracket to the support structure. The connection element may comprise any suitable type if device for the connection, e.g. a wire, a rope, a pin, a beam, or a combination of one or more of these devices.

The wheel assembly may comprise a plurality of wheels which are distributed around the guide wire. The wheel may be distributed in an imaginary, flat wheel plane. Thereby, wheels may be distributed on two wheel assembly legs extending from the guide line. The wheel plane may be parallel and coincide with local part of guide line. One or more of the wheels may be located on a first side of the guide line, and one or more of the wheels may be located on a second side of the guide line, which second side is opposite to the first side. The wheels may be oriented in parallel with the wheel plane. Thereby, the wheels may be arranged to engage, and roll along, the guide line. In some embodiments, the wheels may be distributed on three or more wheel assembly legs extending from the guide line. Each wheel assembly leg may comprise one, two or more wheels. The distribution of wheels on two opposite sides of the guide line, or on three of more sides of the guide line, may provide a firm engagement of the wheel assembly with the guide line.

Preferably, one or more of the wheels is spring loaded, so as to be biased against the guide line. This allows displacement of the spring-loaded wheel(s), away from the guide line, when the wheel rolls over the retainer bracket engaging the guide line. Thus, such a travelling wheel may allow the wheel assembly to ride over the retainer.

Preferably, the wheel assembly extends, as seen along the guide line, less than a full turn around the guide line, the wheel assembly thereby presenting an assembly opening in the circumferential direction of the guide line. For example, the wheel assembly may comprise a support element providing the function of a carrier for the wheels in the wheel assembly. The support element may be a sole carrier for all the wheels in the wheel assembly. The support element may be arranged to extend past the guide line, on a single side of the guide line. The retainer bracket may be arranged to extend through the assembly opening. The retainer bracket may extend from the guide line, on a side of the guide line which is opposite to the side on which the support element extends past the guide line. Thereby, interference between the wheel assembly and the retainer, preventing the wheel assembly to pass the retainer, may be avoided.

In some embodiments, the retainer may be arranged to allow the guide line to change direction at the retainer. The support structure may comprise a first structure segment and a second structure segment. In some embodiments, the first structure segment may be referred to as a main boom. Herein, for some embodiments, the first structure segment may also be referred to as a first boom segment. In some embodiments, the second support segment may be a jib. Herein, for some embodiments, the second structure segment may also be referred to as a second boom segment. The second structure segment may be, in an erected condition of the support structure located above the first structure segment. A lower end of the second structure segment may be, in an erected condition of the support structure, connected to an upper end of the first structure segment via a flexible segment joint. This allows luffing of the second structure segment in relation to the first structure segment. The guide line may be arranged to extend past the segment joint. The retainer may be arranged to be located at substantially the same height as the segment joint. The retainer may be arranged to be located at substantially the same height as the segment joint, at least when the structure segments extend vertically.

Thereby, the guideline may be allowed to run along the first structure segment as well as along the second structure segment. The guide line may be allowed to run past the segment joint. Thus, the retainer may be used for allowing the guide line to "turn a corner", at the segment joint. Thereby, a crane jib with a guide line is allowed. Also, the control line system may be allowed to maintain its functional geometry even when jib is luffed.

The lifting assembly may comprise a further guide line arranged to extend from a first location to a second location. The lifting assembly may comprise a further wheel assembly with one or more wheels arranged to engage, and roll along, the further guide line. The lifting assembly may comprise a further control line assembly arranged to extend from the further wheel assembly to the suspended load. The lifting assembly may comprise a further retainer arranged to connect, between the first and second locations, the further guide line to the support structure. The guide lines may extend substantially in parallel. The control line assemblies may extend to respective points on the suspended load, which points are located at a distance from each other. Thereby, the control of the load is further increased. The further guide line may be arranged to extend along the support structure. The first location may be under the second location. The first location may be on the support structure. The first location may be on a supporting element supporting the support structure, such as an over carriage of a crane, the ground, or a marine vessel. The second location may be on the support structure.

In some embodiments, a plurality of retainers, each arranged to connect a respective guide line to the support structure, may be arranged distributed along the guide line. Thereby, the retention of the guide line may be further secured. This may be beneficial in the case of a very long guide line. For example, there may be two or three or four or more retainers arranged spaced apart along a guide wire between a first location and a second location.

The objects are also reached with a method for handling a component, in particular a wind turbine component. The method comprises erecting a support structure. The method comprises arranging a guide line to extend from a first location to a second location comprising. The method comprises arranging a wheel assembly with one or more wheels engaging, and arranged to roll along, the guide line. The method comprises arranging a control line assembly to extend from the wheel assembly to a load, the load comprising the component and being suspended from the support structure. The method comprises arranging a retainer to connect, between the first and second locations, the guide line to the support structure.

Advantages with such a method is understood from the disclosure above of embodiments of the lifting assembly. The guide line may be arranged to extend along the support structure. The first location may be under the second location, in the erected condition of the support structure. The first location may be on the support structure. The first location may be on a supporting element supporting the support structure, such as an over carriage of a crane, the ground, or a marine vessel. The second location may be on the support structure. It should be noted that the guide line could be arranged to extend from the first location to the second location, before or after the erection of the support structure. In preferred embodiments, the guide line is arranged to extend along the support structure, while the support structure is substantially horizontal. Thereby, the arrangement of the guide line along the support structure can be done on a supporting element, such as the ground. Thereafter, the support structure may be erected.

The method may comprise erecting the support structure so that a lower end of a second structure segment of the support structure is connected to an upper end of a first structure segment of the support structure via a flexible segment joint, and, while controlling the second structure segment so as to extend in a non-zero angle to a longitudinal direction of the first structure segment, allowing the retainer to limit or prevent a movement of the guide line in relation to the joint so as to keep the guide line substantially parallel to the structure segments. Thus, the method may comprise allowing the guide line to extend past the segment joint. Thereby, the method may beneficially comprise keeping the guide line substantially parallel to the structure segments while luffing second structure segment.

Preferably, arranging a retainer comprises fixing the retainer to the guide line by means of a retainer bracket. Preferably, the method comprises adjusting the height of the suspended load, and allowing the wheel assembly to follow, by means of the control line assembly, the load, to thereby allow at least one of the wheels of the wheel assembly to roll along the guide line, and over the retainer bracket.

BRIEF DESCRIPTION OF THE DRAWINGS

Below, embodiments of the invention will be described with reference to the drawings, in which.

DETAILED DESCRIPTION OF EMBODIMENTS

Figure 1:
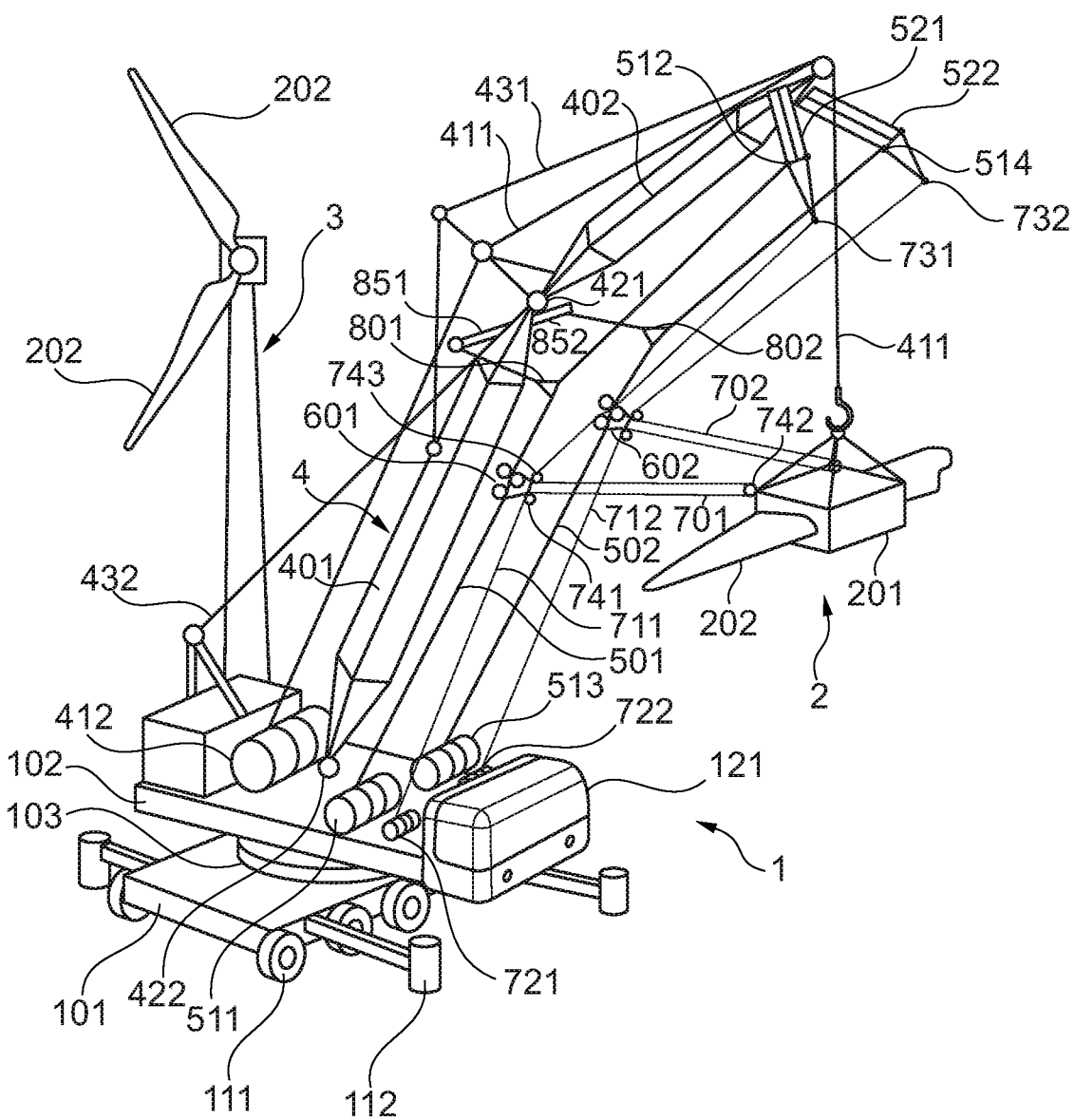
FIG. 1 shows a perspective view of a lifting assembly according to an embodiment of the invention.

FIG. 1 shows a lifting assembly 1 in the form of a crane, according to an embodiment of the invention. A lifting assembly 1 according to embodiments of the invention may be adapted to lift a load 2. The load may also include a yoke 201. The yoke 201 may be adapted to hold a wind turbine component 202. The wind turbine component may be a wind turbine blade 202, as illustrated in FIG. 1. The lifting assembly 1 might be used for installing a wind turbine 3, as illustrated in FIG. 1. For example, the lifting assembly 1 might be used to install one or more blades 202 of the wind turbine 3, as exemplified in FIG. 1.

The crane may comprise an undercarriage 101. The undercarriage may be arranged to be supported by the ground. The crane may be a mobile crane. The undercarriage may comprise a plurality of wheels 111. The undercarriage may present one or more outriggers 112, to stabilise the crane. In some embodiments, the undercarriage may be supported by a marine vessel, e.g. for offshore wind turbine installation.

The crane may comprise an over carriage 102. The over carriage 102 may be arranged over the under carriage 101. The over carriage 102 may be connected to the undercarriage 101 via a slewing bearing 103. The over carriage 102 may be arranged to rotate, around a substantially vertical axis, in relation to the undercarriage 101, by means of the slewing bearing 103. The undercarriage may present a crane operator's cabin 121.

The lifting assembly 1 may comprise an elongated support structure 4. The support structure may be an elongated boom assembly, as exemplified in FIG. 1. The boom assembly may be mounted on the over carriage 102. The support structure 4 may comprise one or more structure segments, e.g. in the form of a respective lower and an upper structure segment 401, 402 as exemplified in FIG. 1. The support structure 4 may comprise a first structure segment 401, e.g. in the form of a first boom segment as exemplified in FIG. 1. The support structure 4 may comprise a second structure segment 402, e.g. in the form of a second boom segment, as exemplified in FIG. 1. The first structure segment 402 may form a main boom, as exemplified in FIG. 1 or a main tower. The second structure segment 402 may form a jib, as exemplified in FIG. 1 or a tower jib or boom jib or boom. One or more of the structure segments 401, 402 may be telescopic.

A lower end of the second structure segment 402 may be, in an erected condition of the support structure 4, connected to an upper end of the first structure segment 401. The second structure segment lower end may be connected to the first structure segment upper via a flexible segment joint 421, as exemplified in FIG. 1. Flexible segment joint 421 may be a type of articulation such as a hinge. This may allow luffing of the second structure segment 402 in relation to the first structure segment 401. More specifically, the angle subtended between a longitudinal direction of the second structure segment 402 and a longitudinal direction of the first structure segment 401, may be of the order of 5 degrees or more, or 10 degrees or more or 15 degrees or more. Still more specifically, the angle of a longitudinal direction of the second structure segment 402, in relation to a longitudinal direction of the first structure segment 401, may be adjustable. Such adjustment may be performed by any suitable means such as by a hydraulic coupling or for example by means of a winch and jib guy line 431, as exemplified in FIG. 1.

The support structure 4 may be connected to the over carriage 102 via an assembly joint 422. More specifically, a lower end of the first structure segment 401 may be connected to the over carriage 102 via the assembly joint 422. This may allow luffing of the first structure segment 401 in relation to the over carriage 102. More specifically, the angle of the longitudinal direction of the first structure segment 401, in relation to the over carriage 102, may be adjusted. Such adjustment may be performed by means of a boom guy line 432, as exemplified in FIG. 1.

The lifting assembly 1 may be adapted to keep the load 2 suspended from the support structure 4. The lifting assembly 1 may be adapted to keep the load 2 suspended from the second structure segment 402. The lifting assembly may be adapted to keep the load 2 suspended from an upper end of the second structure segment 402. The lifting assembly 1 may be adapted to keep the load 2 suspended by means of a lifting wire 411. The lifting assembly 1 may be adapted to keep the yoke 201 suspended by means of a lifting wire 411. The height of the load 2 may be controlled by a winding drum 412 on the over carriage 102. Thus, the winding drum 412 may be arranged to reel the lifting wire 411 in or out.

The lifting assembly 1 comprises a control line system. The control line system may comprise one or more guide lines 501, 502. In embodiments of the invention, two guide lines 501, 502 are arranged to extend along the support structure 4. The guide lines 501, 502 are herein also referred to as a guide line 501, and a further guide line 502. The guide lines are herein also referred to as a first guide line 501 and a second guide line 502. In some embodiments, the guide lines 501, 502 extend substantially in parallel. The guide lines 501, 502 may be provided at a distance from each other. The guide lines may be provided on opposite sides of an imaginary plane in which the support structure 4 and the lifting wire extends. In embodiments, only a single guide line 501, 502 may be installed at a lifting assembly 4.

The first guide line 501 may extend from a first location to a second location. The first location may be on the over carriage 102. A first guide line winch 511 may be provided at the first location. The first guide line winch 511 may allow adjustments of the tension in the first guide line 501. The second location may be towards the top of a structure segment 401, 402. Alternatively or additionally, the second location may be towards the top of a support structure 4. In FIG. 1, the guide lines 401, 402 extend to near the top of a second structure segment 402. In FIG. 1, the guide lines 501, 502 extend to a respective holding element 521, 522 extending, e.g. laterally, from the second structure segment 402. A holding element 521, 522 may otherwise be known as a traverse.

The second guide line 502 may extend from a second guide line winch 513 at a first location to a second location. The first location may be on the over carriage 102. The second guide line winch 513 may allow adjustments of the tension in the second guide line 502.

The control line system may comprise one or more wheel assemblies 601, 602. A first wheel assembly 601, with a plurality of wheels, may be arranged to engage, and roll along, the first guide line 501. A second wheel assembly 602, with a plurality of wheels, may be arranged to engage, and roll along, the second guide line 502. The first and second wheel assemblies 601, 602 are herein also referred to as a wheel assembly 601, and a further wheel assembly 602, respectively.

The control line system may comprise one or more control line assemblies. A first control line assembly 701 may be arranged to extend through or from the first wheel assembly 601 to the suspended load 2. A second control line assembly 702 may be arranged to extend through or from the second wheel assembly 602 to the suspended load 2. The first and second control line assemblies 701, 702 are herein also referred to as a control line assembly 701, and a further control line assembly 702, respectively.

The control line assemblies 701, 702 may extend to respective load points of the suspended load. Said load points are preferably located on the yoke 201, as exemplified in FIG. 1. Alternatively, one or both of said load points may be located on the component 202. Said load points are preferably located at a distance from each other. Said load points are preferably located at opposite sides of a centre of gravity of the load 2. Thereby, the control line assemblies 701, 702 may be used for controlling the orientation of the load 2. For example, the control line assemblies 701, 702 may be used for controlling swivel motions of suspended load 2.

As the suspended load 2 moves vertically, each wheel assembly 601, 602 follows, by means of the respective control line assembly 701, 702, along the respective guide line 501, 502.

In some embodiments, as the one in FIG. 1, each control line assembly 701, 702 comprises a control line 711, 712 extending from a first position below the respective wheel assembly 601, 602, to a second position above the respective wheel assembly. A control line winch 721, 722 may be provided at the respective first position. Each control line winch 721, 722 may be provided by way of example at a crane base e.g. on an over carriage 102 thereof. Each control line winch 721, 722 may be arranged to reel the respective control line 711, 712 in or out. Each second position may be on a respective holding element 521, 522, extending, e.g. laterally, from the second structure segment 402. In some embodiments, each second position may be on a second, especially an upper, structure segment 402. The respective control line 711, 712 may extend from the respective first position, via a respective first pulley wheel 741 mounted on the respective wheel assembly 601, 602, to a respective second pulley wheel 742 at the respective load point, and back to a respective third pulley wheel 743 mounted on the respective wheel assembly 601, 602, and from the respective third pulley wheel 743 to the respective second position. Thereby, distance between the respective wheel assembly 601, 602 and the respective load point may be adjusted by means of the respective control line winch 721, 722.

In alternative embodiments, each control line assembly 701, 702 may comprise a control line extending from a respective of the wheel assemblies 601, 602 to a respective control line winch at a respective of the load points on the load 2.

Embodiments of the invention comprises a first retainer 801 arranged to connect, between the first and second locations, the first guide line 501 to the support structure 4. A second retainer 802 may be arranged to connect, between the first and second locations, the second guide line 502 to the support structure 4. The first and second retainer 801, 802 are herein also referred to as a retainer 801, and a further retainer 802, respectively. Numerals 512 and 514 in FIG. 1 may designate a second location to which a guide wire may extend.

In some embodiments, the respective retainer 801, 802 is arranged to connect the respective guide line 501, 502 to the first structure segment 401, as exemplified in FIG. 1. In some embodiments, the respective retainer 801, 802 is arranged to connect the respective guide line 501, 502 to the second structure segment 402.

Each retainer 801, 802 may comprise a retainer bracket, an example of which is described closer below, for fixing the respective retainer to the respective guide line 501, 502. Further, each retainer may comprise a connection element, connecting the respective retainer bracket to the support structure 4. In some embodiments, the connection element comprises a securing element 851, 852 protruding, e.g. laterally, from the support structure 4. A securing element 851, 852 for a retainer 801, 802 may be known as an intermediate traverse.

The first and/or the second retainer 801, 802 is preferably located at a distance from the respective first and second locations of the first and/or second guide line 501, 502. The first and/or the second retainer 801, 802 is preferably located in between, and at a distance from, the respective first and second locations of the first and/or second guide line 501, 502. Each retainer 801, 802 may restrain the respective guide line 501, 502 from being pulled away from the support structure 4, e.g. by loads acting on the respective control line assembly 701, 702.

It should be noted that in some embodiments a single guide line 501 or 502 may be arranged to extend along the support structure 4, from a first location to a second location. Thereby, a single wheel assembly 601 or 602, with one or more wheels, may be arranged to engage, and roll along, the guide line 501 or 502. A single control line assembly 701 or 702 may be arranged to extend from the wheel assembly 601 or 602 to a load 2 suspended from the support structure 4. A single retainer 801 or 802 may be arranged to connect, between the first and second locations, the guide line 501 or 502 to the support structure 4.

The, or each, guide line 501, 502 may be embodied in any suitable manner, e.g. as a wire, or as a rope. The, or each, control line 711, 712 may be embodied in any suitable manner, e.g. as a wire, or as a rope.

In some embodiments, the, or each, retainer 801 or 802 may be arranged to allow the respective guide line 501 or 502 to change direction at the retainer 801 or 802. Where a segment joint 421 is provided, as exemplified in FIG. 1, the guide line(s) 501, 502 may be arranged to extend past, e.g. upwards beyond, the segment joint 421. Preferably, each retainer 801 or 802 is thereby arranged to be located at substantially the same height as the segment joint 421. This allows the guide line(s) 501, 502 to remain at a substantially constant distance from the segment joint 421, as the second structure segment 402 is luffed, i.e. controlled so as to extend in a variety of non-zero angles to the longitudinal direction of the first structure segment 401. This allows the guide line(s) 501, 502 to remain substantially in parallel with each structure segment, when the second structure segment 402 is luffed. The, or each, guide line 501, 502 may thereby present a corner along its extension. A corner along a guide line 501, 502 may correspond to and/or compensate for an inflection between segments of a support structure 4. A corner along a guide wire 501 or 502 may in particular ensure that the separation distance between the guide line 501 or 502 and an inflected support structure 4 remains substantially constant between the first and the second location. In other words, a corner along a guide line 501 or 502 may ensure that the guide line 501 or 502 runs parallel or substantially parallel to the structure segments 401, 402 between the first and the second location of a lifting assembly 1 with an inflected support structure 4. A lower section of a guide line 501, 502 may be near a first location. A lower section of a guide line 501, 502 may extend from a first location. An upper section of a guide line 501, 502 may be near a second location. An upper section of a guide line 501, 502 may extend to a second location. A corner along a guide line 501 or 502 may divide a first, lower section of a guide line 501, 502 from a second, upper section of the guide line 501 or 502. In other words, a lower section of a guide line 501, 502 may run substantially parallel to a first structure segment 401 of a support structure 4. An upper section of a guide line 501, 502 may run substantially parallel to a second structure segment 402 of a support structure 4. A corner along a guide line 501 or 502 may ensure that the guide line 501 or 502 runs parallel or substantially parallel to the structure segments 401, 402 between the first and the second location of a lifting assembly 1 with an inflected support structure 4.

Figure 2:
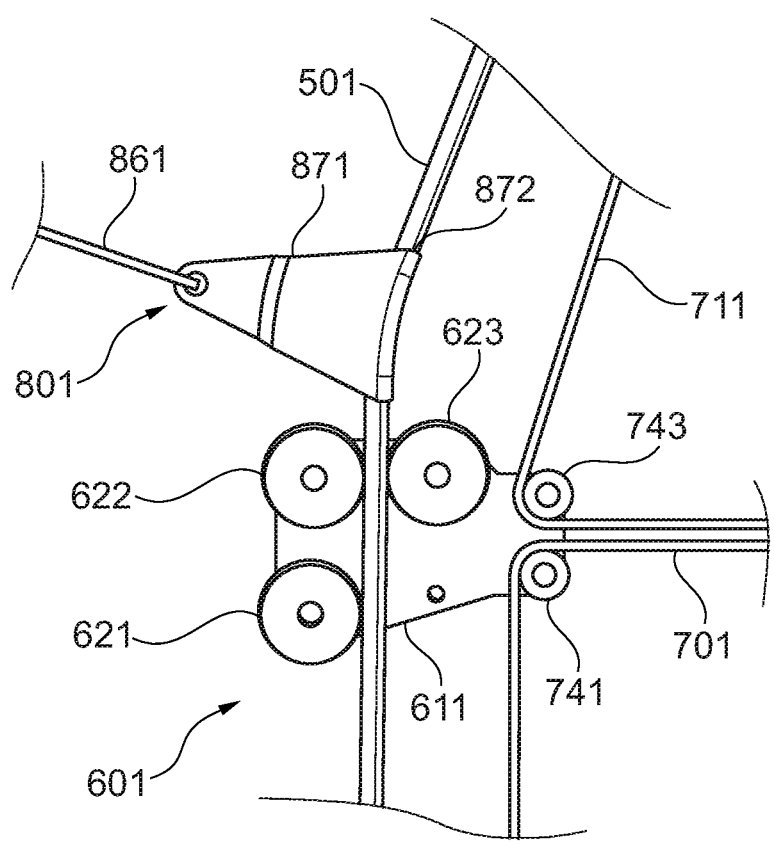
FIG. 2 shows a detail of the lifting assembly in FIG. 1.
Figure 3:
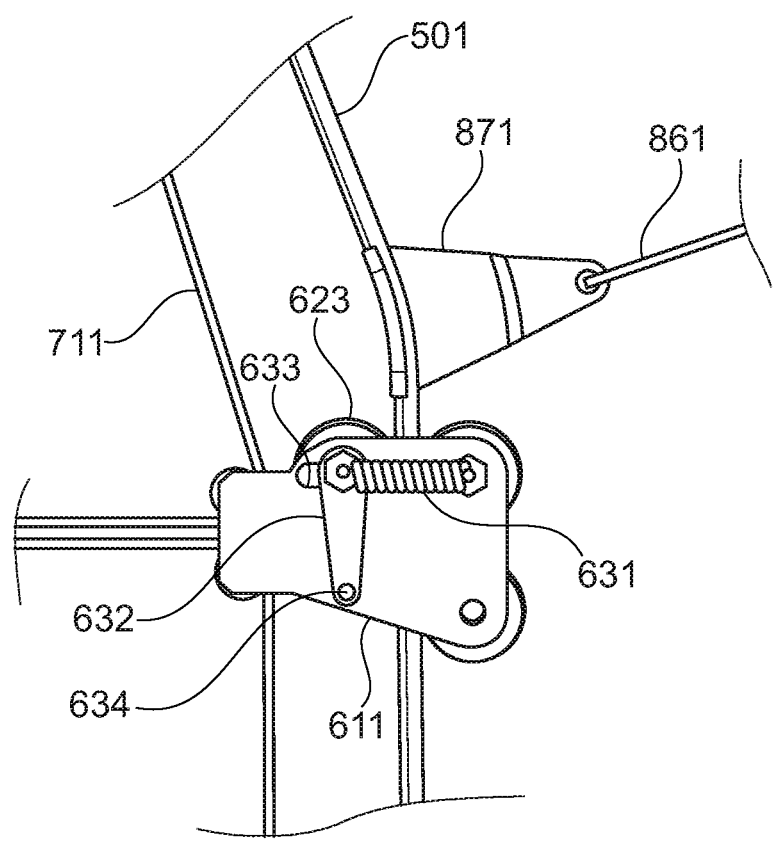
FIG. 3 shows the detail in FIG. 2, as seen from the opposite side.

Reference is made also to FIG. 2 and FIG. 3, showing a part of one of the guide lines 501, a part of one of the retainers 801, one of the wheel assemblies 601, and a part of one of the control line assemblies 701, of the example in FIG. 1. As suggested, the retainer 801 may comprise a retainer bracket 871 for fixing the retainer to the guide line 501.

As suggested, the retainer 801, 802 may also comprise a connection element, connecting the retainer bracket to the support structure 4. The connection element may comprise a securing line 861. The securing line 861 may extend from the retainer bracket 871 to the support structure 4. Alternatively, the securing line 861 may extend from the retainer bracket 871 to a securing element 851 protruding, e.g. laterally, from the support structure 4, as exemplified above with reference to FIG. 1. In some embodiments, the securing element 851 and the securing line 861 may be collectively formed by a pin or a beam extending from the retainer bracket 871 to the support structure 4.

The retainer bracket 871 may form a seat 872 for a portion of the guide line 501. The retainer bracket may partly, or fully enclose a portion of the guide line. The retainer may be engaged with the guide line 501, 502 by a seat 872. The guide line 501, 502 may be held in the seat by a tension in the securing line 861. The retainer bracket seat 872 may have a rounded shape, as seen perpendicularly to the guide line 501, 502 to accommodate for the change in direction of the guide line 501, at the retainer 801. The rounded shape of a retainer bracket seat 872 may define a corner in a guide line 501, 502. In some embodiments, the retainer bracket 871 may present a clamp, arranged to engage a portion of the guide line 501. In some embodiments the rounded shape of a retainer bracket seat 872 may define a corner having a greater subtended angle than a corner on a guide wire 501, 502 passing around it. In other words, a guide line 501, 502 may pass over an arc of a said retainer bracket seat 872 which arc extends along less than the full extent of the curvature of said retainer bracket seat 872.

The wheel assembly 601 comprises a plurality of wheels which are mounted so they can be distributed around the guide line 501, 502 when in use. The wheels may be distributed in an imaginary, flat wheel plane, as exemplified in FIG. 2 and FIG. 3. The wheels are preferably oriented in parallel with the wheel plane. The wheel plane is preferably parallel and coinciding with the guide line 501, or at least with a portion of the guide line 501 which is in engagement with the wheels.

The wheel assembly 601, 602 may comprise three wheels, as in the example in FIG. 2. One or more of the wheels may be located at said wheel assembly 601 in a position corresponding to a first side of a guide line 501. The first side of a guide line 501 may be the side of a guide line 501 on which the securing line 861 is provided. As exemplified in FIG. 2, two wheels 621, 622 may be located at said wheel assembly 601 in a position corresponding to a first side of the guide line 501. One or more of the wheels may be located at said wheel assembly 601 in a position corresponding to a second side of the guide line 501, 502, which second side is opposite to the said first side. As exemplified in FIG. 2, one wheel 623 may be located at said wheel assembly 601 in a position corresponding to the second side of a guide line 501.

The wheels 621, 622, 623 are preferably arranged to engage, and roll along, the guide line 501. A wheel assembly 601, 602 preferably comprises a support element 611 providing the function of a sole carrier for all the wheels in the wheel assembly 601. The support element 611 is preferably arranged to extend past a position corresponding to a guide line 501, 502, on a single side of the guide line 501, 502. Preferably, the retainer bracket 871 is configured to extend from a position corresponding to the guide line 501, on a side of the guide line 501 which is opposite to the side on which a support element 611 may extend past the guide line 501, 502. Thereby, when guide wire 501, 501 extends over a retainer 801, 802, the wheel assembly 601 may pass the retainer 801, without interference between the support element 611 and the retainer 801. In other words, a wheel assembly 601 may ride over a retainer 801, 802 on a guide wire 501, 502. In other words, a wheel assembly 601 may pass unhindered from a lower section of a guide line 501, 502 to an upper section thereof. In other words, a wheel assembly 601 may pass unhindered from a lower section of a guide wire 501, 502 near a first location to an upper section thereof near a second location. The wheel assembly 601, 602 may extend, as seen along a guide line 501, 502, less than a full turn circumferentially around the axis of the guide line 501, 502. Thereby the wheel assembly 601 may present an assembly opening defining a sector in the circumferential direction of a guide line 501. The assembly opening may be to a side of a guide line 501 which is opposite to the side on which the support element 611 extends past a guide line 501. The retainer 801, 802 may thereby pass through the assembly opening. Alternatively, the retainer 801, 802 may be surrounded by the wheel assembly 601, 602 as the wheel assembly 601, 602 moves past it.

The one or more wheels located to be on the second side of a guide line 501, 502 are preferably spring loaded, so as to be biased to push against a guide line 501, 502. Moreover, these will be pushed against the retainer 801, 802 while the wheel assembly 601, 602 passes a retainer 801, 802. In the example shown in FIG. 3, the wheel 623 located on the second side of a guide line 501, 502 may be spring loaded, so as to be biased towards a guide line 501, 502 passing through the wheel assembly 601, 602. Thereby, the wheel 623 will be pushed against the retainer 801, 802 while the wheel assembly 601, 602 passes a retainer 801, 802. The support element 611 may comprise a leg 632 which is joined to the remainder of the support element 611 by a pivot joint 634. Thereby, the leg 632 may be allowed to pivot around as axis which is perpendicular to the wheel plane. The wheel 623, located at a position corresponding to the second side of a guide line 501, may be mounted to the leg 632 at a distance from the pivot joint 634. A spring 631 may be arranged to bias the leg 632, with the wheel 623 mounted to the leg 632, so as to bias the wheel 623 against the guide line 501. This allows displacement of the spring-loaded wheel 623 along a slot 633 away from the guide line 501, when rolling over the retainer bracket 871 engaging the guide line 501.

Alternatives are of course possible for allowing wheel displacement, when rolling over the retainer bracket 871. For example, the one or more wheels located at a wheel assembly 601, 602 at a position corresponding to the first side of a guide line 501, e.g. the side of the guide line on which the securing line 861 is provided, may be spring loaded, so as to be biased against the guide line 501 when in use.

FIG. 2 shows an example of a control line assembly 701. The control line assembly 701 may comprise, as suggested above, a control line 711 extending via a first pulley wheel 741 mounted on the wheel assembly 601, to a second pulley wheel 742 (FIG. 1) at the respective load point, and back to a third pulley wheel 743 mounted on the wheel assembly 601.

Figure 4:
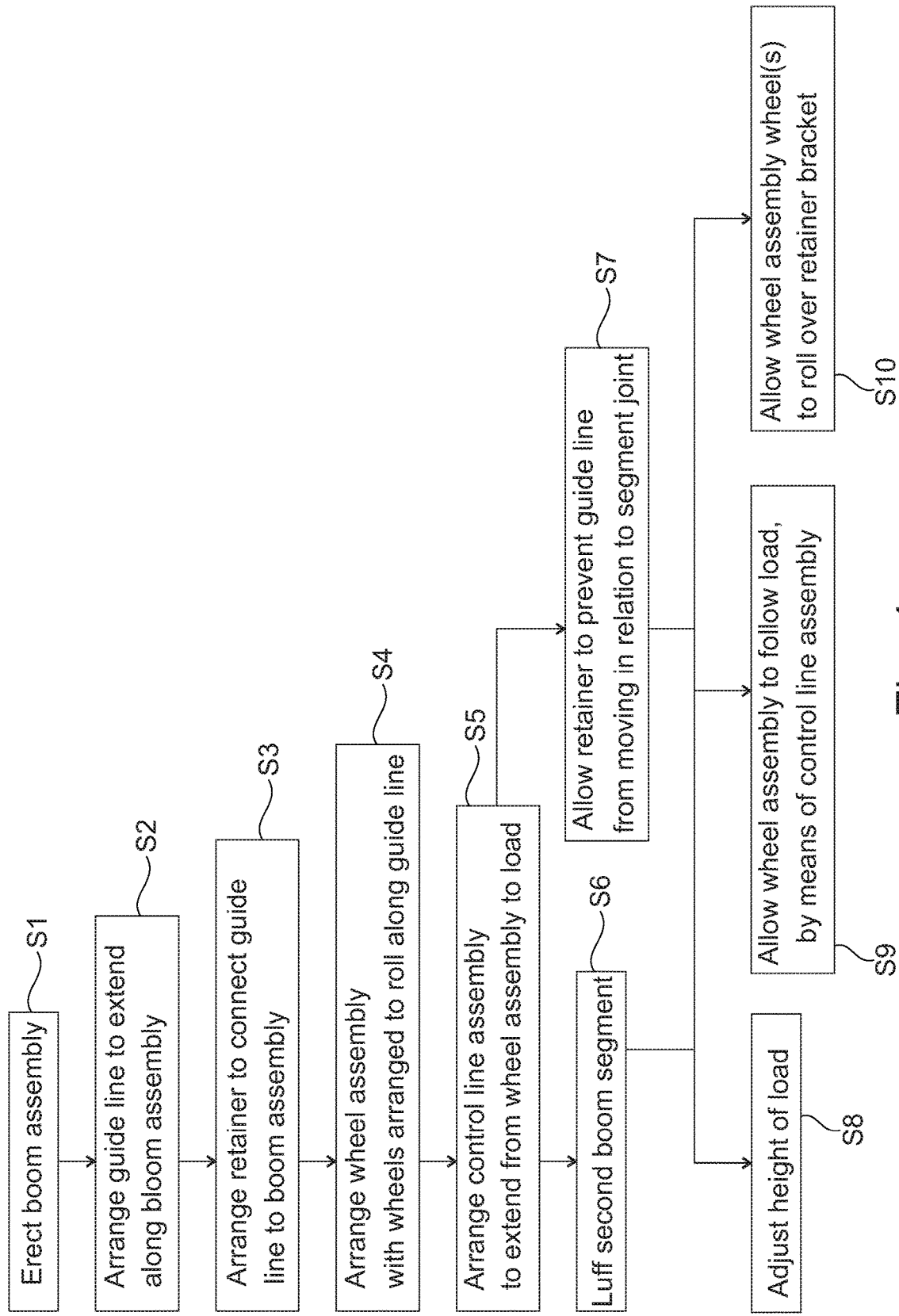
FIG. 4 is a block diagram depicting steps in a method of handling a wind turbine component, according to an embodiment of the invention.

Reference is made also to FIG. 4, depicting steps in a method for handling a wind turbine component 202. The method could make use of a lifting assembly 1 according to a variety of embodiments of the invention, for example the one shown in FIG. 1.

The method preferably comprises erecting S1 an elongated support structure, e.g. a boom assembly, comprising one or more structure segments, e.g. boom segments. Thereby, a lower end of a second structure segment may be connected to an upper end of a first structure segment via a flexible segment joint. The method preferably further comprises arranging S2 a guide line to extend along the support structure, from a first location to a second location. Advantageously, the method preferably comprises arranging S3 a retainer to connect, between the first and second locations, the guide line to the support structure. The method preferably also comprises arranging S4 a wheel assembly with one or more wheels engaging, and arranged to roll along, the guide line. The method preferably comprises in addition arranging S5 a control line assembly to extend from the wheel assembly to a load, comprising the component, suspended from the support structure.

Embodiments of the method may comprise, while controlling S6 the second structure segment so as to extend in a non-zero angle to a longitudinal direction of the first structure segment, e.g. while luffing second structure segment, allowing S7 the retainer to prevent the guide line from moving in relation to the segment joint. Thereby, the guide line may be kept substantially parallel to the structure segments.

The method may further comprise adjusting S8 the height of the suspended load. The method may also comprise allowing S9 the wheel assembly to follow the suspended load, by means of the control line assembly. Thereby, at least one of the wheels of the wheel assembly may be allowed to roll S10 along the guide line, and over the retainer bracket.

Figure 5:
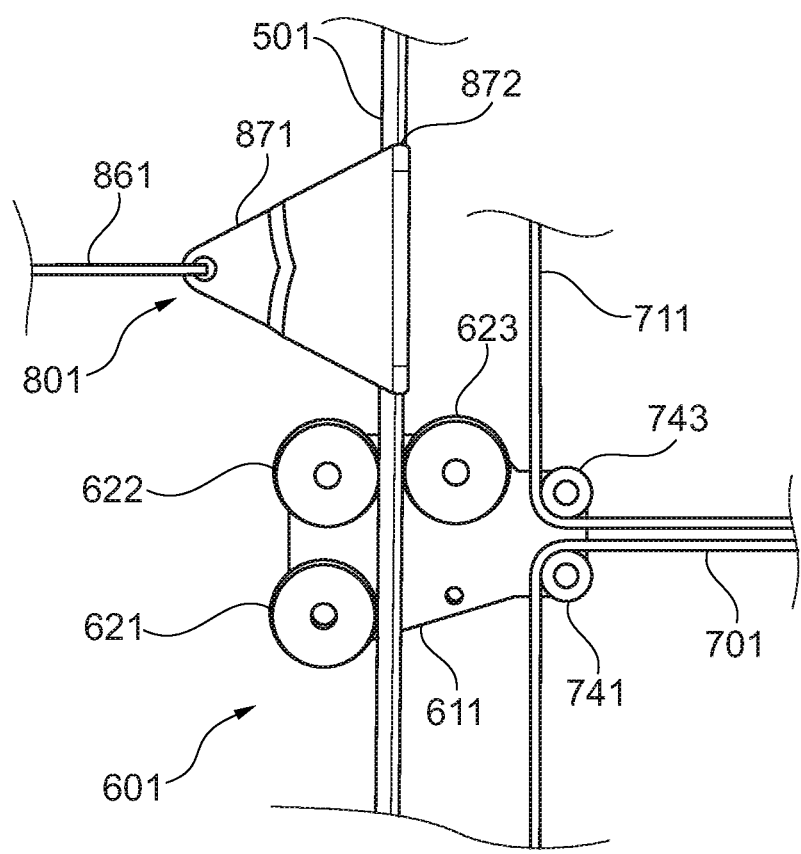
FIG. 5 shows a detail, similar to the one shown in FIG. 2, according to another embodiment of the invention.

Reference is made to FIG. 5. In embodiments of the invention, a retainer may be arranged to connect a guide line to the support structure, along a structure segment, (e.g. #401 in FIG. 1), of the support structure. Where the guide line is arranged to extend along the structure segment, from a first location to a second location, the first and second locations may be provided along the structure segment. For example, the first and second locations may be provided at respective ends of the structure segment. The retainer may be arranged to connect the guide line to the structure segment, at a distance from the first and second locations. For example, the retainer may be arranged to connect the guide line to the structure segment, substantially half way between the first and second locations. The retainer may be arranged to connect the guide line to the structure segment, at a distance from the ends of the structure segment. For example, the retainer may be arranged to connect the guide line to the structure segment, substantially half way between the ends of the structure segment. The retainer may prevent the guide line from moving away from the structure segment, e.g. due to forces in a control line assembly arranged to extend from a load suspended from the support structure to a wheel assembly with one or more wheels arranged to engage, and roll along, the guide line.

The retainer could be embodied as exemplified in FIG. 5. Thus, the retainer 801 could present a seat 872 for the guide line 501. In such embodiments, the retainer may not be arranged to create a corner in the guide line, e.g. when luffing a boom section, as exemplified above. The retainer 801 may simply prevent the guide line from moving away from the support structure 4. The guide line 501 may be held in the seat by a tension in the securing line 861. The retainer bracket seat 872 may be straight, as seen perpendicularly to the guide line 501, 502. This may accommodate the guide line 501 continuing straight past the retainer 801. In some embodiments, the retainer bracket 871 may present a clamp, arranged to engage a portion of the guide line 501.

In some embodiments, a plurality of retainers 801, 802 may be provided along a guide line 501, 502 arranged to extend along a support structure 4, from a first location to a second location. Each retainer 801, 802 may be arranged to connect the guide line 501, 502 to the support structure 4.

The retainers 801, 802 may be arranged to be distributed along the guide line 501, 502.

Figure 6:
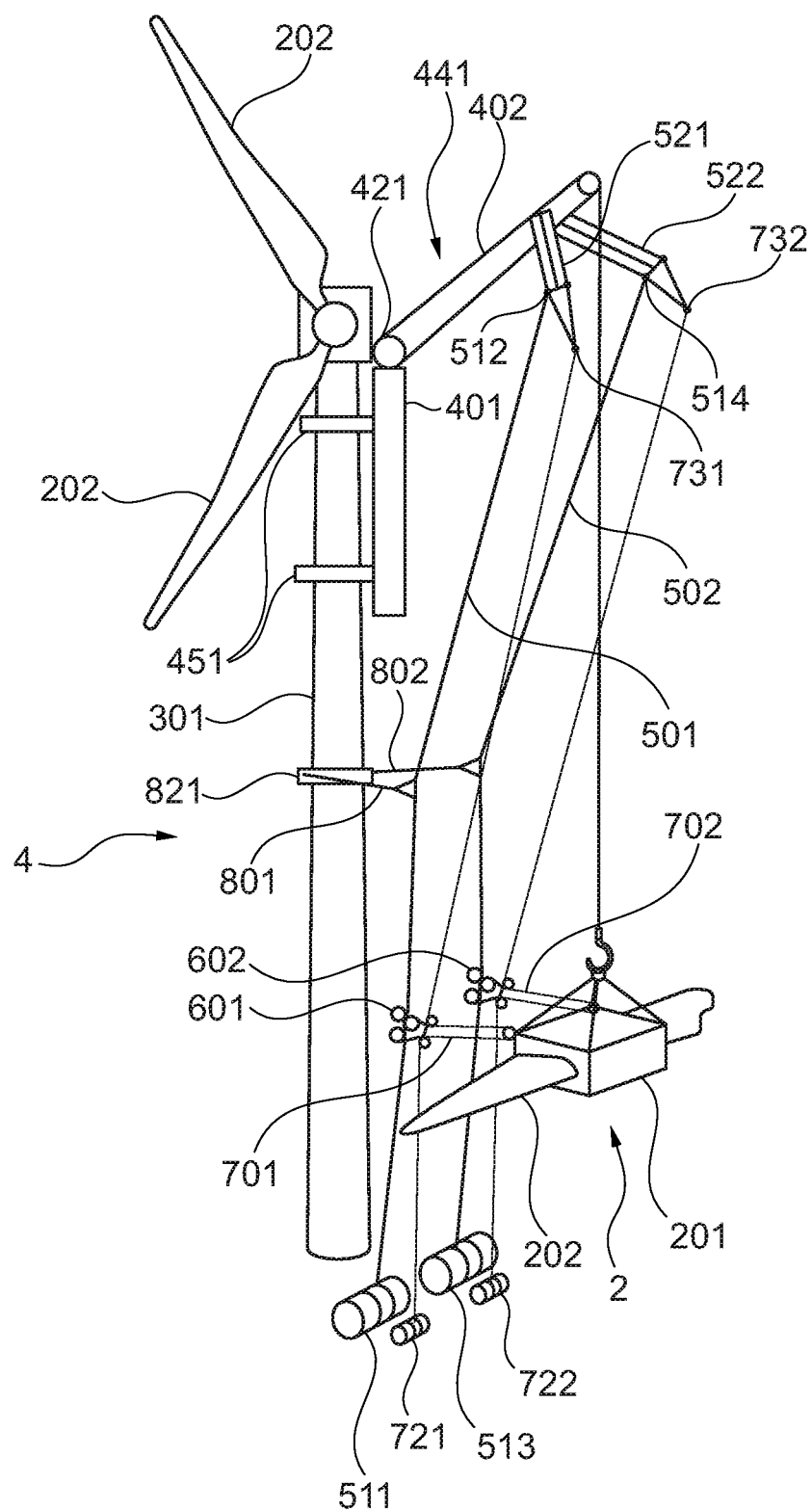
FIG. 6 shows a perspective view of a lifting assembly according to an alternative embodiment of the invention.

FIG. 6 shows a lifting arrangement 1 comprising a wind turbine tower 301 and a crane 441 mounted to the tower. The crane 441 may be arranged to a load, for example including a wind turbine component 202, such as a blade, to be installed in the wind turbine. The load may include a yoke 201.

The crane 441 may comprise a base 401, mounted to the tower 301, as exemplified in FIG. 6. The base may the elongated. The base may be arranged to extend vertically along a portion of the tower. One or more fastening brackets 451 may be arranged to fastened the base to the tower. Each fastening bracket 451 may be arranged to embrace the tower, as exemplified in FIG. 6.

The base may also be referred to as a first boom segment. The combination of the tower 301 and the crane base may comprise a first structure segment 401. The arrangement including crane 441 may comprise a second boom segment. The second boom segment may be referred to as a second structure segment 402. A lower end of the second structure segment may be connected to an upper end of the first structure segment 401. Thus, a lower end of the second structure segment 402 may be connected to an upper end of the first structure segment 401, comprising the first boom segment and the tower 301. The second structure segment lower end may be connected to the first boom segment upper via a flexible segment joint 421, as exemplified in FIG. 6. This may allow luffing of the second structure segment 402 in relation to the first structure segment 401. The second structure segment 402 may be arranged to rotate, around a substantially vertical axis, in relation to the first structure segment 401.

The crane 441 may be adapted to keep the load 2 suspended from the support structure 4. The crane may be adapted to keep the load 2 suspended from the second structure segment 402. The crane may be adapted to keep the load 2 suspended from an upper end of the second structure segment 402. The crane may be adapted to keep the load 2 suspended by means of a lifting wire 411.

The tower 301 and the crane 441 may form what is herein referred to as a support structure 4.

The lifting assembly, 301, 441 comprises a control line system. The control line system may comprise one or more guide lines. In embodiments of the invention, two guide lines 501, 502 are arranged to extend along the tower 301 and the crane 441. The guide lines are herein also referred to as a first guide line 501 and a second guide line 502. In some embodiments, the guide lines 501, 502 extend substantially in parallel. The guide lines may be provided at a distance from each other.

The first guide line 501 may extend from a first location to a second location. The first location may be on the ground. Alternatively, the first location may be on the tower 301. A first guide line winch may be provided at the first location. The first guide line winch 511 may allow adjustments of the tension in the first guide line 501. The second location may be on a second structure segment 402 or first structure segment 401. In FIG. 6, the second location is shown on a second structure segment 402. In particular, in FIG. 6, the second location is shown on a first holding element 521, extending, e.g. laterally, from a second structure segment 402. In some embodiments, the second location may be on the second structure segment 402 at a different arrangement.

A second guide line 502 may extend from a first location to a second location. The first location may be on the ground or near the ground. Alternatively, the first location may be on the tower 301. A second guide line winch 513 may be provided at the first location. A second guide line winch 513 may allow adjustments of the tension in the second guide line 502. The second location for the second guide wire 502 may be on a second structure segment 402, in particular at a holding element 522, extending, e.g. laterally therefrom.

The control line system may comprise one or more wheel assemblies 601, 602. A first wheel assembly 601, with a plurality of wheels, may be arranged to engage, and roll along, the first guide line 501. A second wheel assembly 602, with a plurality of wheels, may be arranged to engage, and roll along, the second guide line 502.

The control line system may comprise one or more control line assemblies. A first control line assembly 701 may be arranged to extend from the first wheel assembly 601 to the suspended load 2. A second control line assembly 702 may be arranged to extend from the second wheel assembly 602 to the suspended load 2. The control line assemblies 701, 702 may extend to respective load points on the suspended load. Thereby, the control line assemblies 701, 702 may be used for controlling the orientation of the load 2.

As the suspended load 2 moves vertically, each wheel assembly 601, 602 follows, by means of the respective control line assembly 701, 702, along the respective guide line 501, 502.

In some embodiments, as the one in FIG. 6, each control line assembly 701, 702 comprises a control line 711, 712 extending from a first position 721, 722 below the respective wheel assembly 601, 602, to a second position 731, 732 above the respective wheel assembly. A to control line winch may be provided at the respective first position 721, 722. Each control line winch may be provided on the ground, as shown in FIG. 6, or alternatively on the tower 301. Each second position 731, 732 may be on a respective holding element 521, 522, extending, e.g. laterally, from a second structure segment 402. In some embodiments, each second position 731, 732 may be on the second structure segment 402. The respective control line 711, 712 may extend from the respective first position 721, 722, via a respective first pulley wheel mounted on the respective wheel assembly 601, 602, to a respective second pulley wheel at the respective load point, and back to a respective third pulley wheel mounted on the respective wheel assembly 601, 602, and from the respective third pulley wheel to the respective second position 731, 732. Thereby, distance between the respective wheel assembly 601, 602 and the respective load point may be adjusted by means of the respective control line winch.

Embodiments of the invention comprises a first retainer 801 arranged to connect, between the first and second locations, the first guide line 501 to the tower 301. A second retainer 802 may be arranged to connect, between the first and second locations, the second guide line 502 to the tower 301. One or more tower fastening elements 821 may be provided for fastening the retainer(s) to the tower 301. A tower fastening element 821 may be arranged to embrace the tower 301, as exemplified in FIG. 6.

Each retainer 801, 802 may comprise a retainer bracket, an example of which is described above, for fixing the respective retainer to the respective guide line 501, 502. Further, each retainer may comprise a connection element, connecting the respective retainer bracket to the tower, e.g. via a tower fastening element 821.

Each retainer 801, 802 may restrain the respective guide line 501, 502 from being pulled away from the tower 301 by loads acting on the respective control line assembly 701, 702.

Figure 7:
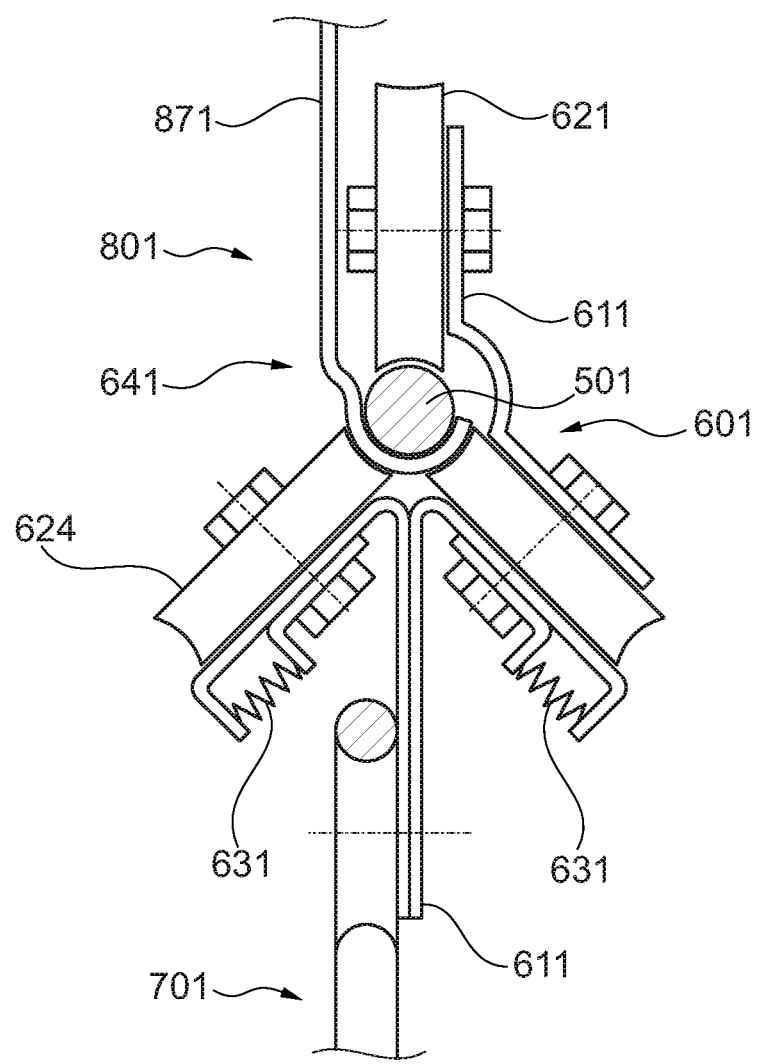
FIG. 7 shows a detail, similar to the one shown in FIG. 2, according to a further embodiment of the invention.

Reference is made also to FIG. 7, showing a wheel assembly 601 according to an alternative embodiment of the invention. FIG. 7 also shows a lateral cross-section of a guide lines 501, e.g. according to any of the embodiments described above. FIG. 7 also shows a part of a retainer 801, e.g. according to any of the embodiments described above. FIG. 7 also shows a part of a control line assemblies 701, e.g. according to any of the embodiments described above. As suggested, the retainer 801 may comprise a retainer bracket 871 for fixing the retainer to the guide line 501. The retainer bracket 871 may form a seat for a portion of the guide line 501.

The wheel assembly 601 comprises a plurality of wheels 621, 623, 624 which are distributed on three wheel assembly legs extending away from the position corresponding to a guide line 501, 502. Thereby, the wheels 621, 623, 624 are arranged to engage a guide line 501. Each wheel assembly leg may comprise one, two or more wheels.

One or more of the wheels 621 may be located at a position corresponding to a side of the guide line 501 on which the retainer 801 extends to the support structure 4 (FIG. 1). Thus, one of the wheel assembly legs may be located at a position corresponding to a side of the guide line 501 on which the retainer 801 extends to the support structure 4. In the example shown in FIG. 7, two of the wheel assembly legs are located at positions corresponding to respective sides of the guide line 501, so as to be separated by more than 90 degrees from the wheel assembly leg which is located at a position corresponding to the side of the guide line 501 on which the retainer 801 will extends to the support structure 4. Thereby, the wheels on separate wheel assembly legs may be oriented in respective planes. Each wheel plane may be oriented at an angle of approximately 120 degrees from each of the two other wheel planes.

The wheels 621, 622, 623 are preferably arranged to engage, and roll along, a guide line 501. The wheel assembly 601 preferably comprises a support element 611 providing the function of a sole carrier for all the wheels in the wheel assembly. The support element 611 may comprise a plurality of brackets, as suggested in FIG. 7. The support element 611 is preferably arranged to extend past a guide line 501, on a single side of the guide line. Preferably, the retainer bracket 871 extends from a position corresponding to the guide line 501, on a side of the guide line which is opposite to the side on which the support element 611 will extend past the guide line 501. Thereby, the wheel assembly 601, 602 may pass unhindered around the retainer 801 while moving along the guide line 501, preferably without interference between the support element 611 and the retainer 801. In other words, the wheel assembly 601 may extend, as seen along the guide line, less than a full turn around a guide line 501 running through it. Thereby the wheel assembly 601 may present an assembly opening 641 over a sector about the circumference of the guide line. The retainer 801 may thereby pass through the assembly opening 641.

The wheels 623, 624 located in said wheel assembly 601, at a position corresponding to the second side of the guide line 501 are preferably spring loaded, so as to be biased to push in a direction against the guide line 501, when positioned therein. On each leg, a spring 631, for example a compression spring, may be arranged to bias the respective wheel 623, 624 in a direction against a guide line 501. This allows displacement of the spring-loaded wheels 623, 624 away from the guide line 501, when rolling over the retainer bracket 871 engaging the guide line 501.

As will be understood by those skilled in the present field of art, numerous changes and modifications may be made to the above described and other embodiments of the present invention, without departing from its scope as defined in the appending claims. For example, a guide line may be any type of flexible connection line such as a guide wire.

The invention claimed is:

1. A lifting assembly comprising
a support structure arranged to support a load suspended from the support structure,
a guide line arranged to extend from a first location to a second location,
a wheel assembly with one or more wheels arranged to engage and roll along the guide line,
a control line assembly arranged to extend from the wheel assembly to the load, and
a retainer arranged to connect, between the first and second locations, the guide line to the support structure,
wherein the wheel assembly is configured to ride over and move past the retainer as the wheel assembly rolls along the guide line.

2. The lifting assembly according to claim 1, wherein the support structure is an elongated boom assembly comprising one or more boom segments.

3. The lifting assembly according to claim 1, wherein the support structure comprises a wind turbine tower, and a crane mounted to the wind turbine tower.

4. The lifting assembly according to claim 3, wherein the retainer is arranged to connect, between the first and second locations, the guide line to the tower.

5. The lifting assembly according to claim 1, wherein the retainer comprises a retainer bracket for fixing the retainer to the guide line.

6. The lifting assembly according to claim 5, wherein the retainer comprises a connection element, connecting the retainer bracket to the support structure.

7. The lifting assembly according to claim 1, wherein the wheel assembly comprises a plurality of wheels which are distributed around the guide line.

8. The lifting assembly according to claim 7, wherein one or more of the wheels is spring loaded so as to be biased against the guide line.

9. The lifting assembly according to claim 7, wherein the wheel assembly extends, as seen along the guide line, less than a full turn around the guide line, the wheel assembly thereby presenting an assembly opening in the circumferential direction of the guide line.

10. The lifting assembly according to claim 9, wherein the retainer bracket is arranged to extend through the assembly opening.

11. The lifting assembly according to claim 1, wherein the retainer is arranged to allow the guide line to change direction at the retainer.

12. The lifting assembly according to claim 1, wherein the support structure comprises a first structure segment and a second structure segment, a lower end of the second structure segment being, in an erected condition of the support structure, connected to an upper end of the first structure segment via a flexible segment joint.

13. The lifting assembly according to claim 12, wherein the guide line is arranged to extend past the segment joint.

14. The lifting assembly according to claim 12, wherein the retainer is arranged to be located at substantially the same height as the segment joint.

15. The lifting assembly according to claim 1, wherein the lifting assembly comprises a further guide line arranged to extend from a first location to a second location, a further wheel assembly with one or more wheels arranged to engage, and roll along, the further guide line, a further control line assembly arranged to extend from the further wheel assembly to the suspended load, and a further retainer arranged to connect, between the first and second locations, the further guide line to the support structure.

16. The lifting assembly according to claim 1, wherein a plurality of retainers, each arranged to connect the guide line to the support structure, are arranged to be distributed along the guide line.

17. A method for handling a component, comprising
erecting a support structure,
arranging a guide line to extend from a first location to a second location,
arranging a wheel assembly with one or more wheels engaging, and arranged to roll along, the guide line, and
arranging a control line assembly to extend from the wheel assembly to a load, the load comprising the component and being suspended from the support structure, and
arranging a retainer to connect, between the first and second locations, the guide line to the support structure, wherein the wheel assembly is configured to ride over and move past the retainer as the wheel assembly rolls along the guide line.

18. The method according to claim 17, comprising erecting the support structure so that a lower end of a second support segment of the support structure is connected to an upper end of a first support segment of the support structure via a flexible segment joint, and, while controlling the second support segment so as to extend in a non-zero angle to a longitudinal direction of the first support segment, allowing the retainer to limit or prevent a movement of the guide line in relation to the segment joint so as to keep the guide line substantially parallel to the support segments.

19. The method according to claim 17, wherein arranging a retainer comprises fixing the retainer to the guide line by means of a retainer bracket.

20. The method according to claim 19, comprising adjusting the height of the suspended load, and allowing the wheel assembly to follow, by means of the control line assembly, the load, to thereby allow at least one of the wheels of the wheel assembly to roll along the guide line, and over the retainer bracket.

* * * * *